US012561558B2

(12) United States Patent
Bashtova et al.

(10) Patent No.: US 12,561,558 B2
(45) Date of Patent: Feb. 24, 2026

(54) METHOD FOR BUILDING A RESOURCE-FRUGAL NEURAL NETWORK

(71) Applicant: ADAGOS, Ramonville-Saint-Agne (FR)

(72) Inventors: Kateryna Bashtova, Ramonville (FR); Mathieu Causse, Ramonville (FR); Baptiste Fedele, Ramonville (FR); Florent Masmoudi, Ramonville (FR); Mohamed Masmoudi, Ramonville (FR); Lionel Salesses, Ramonville (FR); Houcine Turki, Ramonville (FR)

(73) Assignee: ADAGOS, Ramonville-Saint-Agne (FR)

( * ) Notice: Subject to any disclaimer, the term of this patent is extended or adjusted under 35 U.S.C. 154(b) by 1104 days.

(21) Appl. No.: 17/554,628

(22) Filed: Dec. 17, 2021

(65) Prior Publication Data

US 2022/0198271 A1 Jun. 23, 2022

(30) Foreign Application Priority Data

Dec. 18, 2020 (EP) ..................................... 20306601

(51) Int. Cl.
| *G06N 3/08* | (2023.01) |
| *G06N 3/04* | (2023.01) |
| *G06N 5/04* | (2023.01) |

(52) U.S. Cl.
CPC ................. G06N 3/08 (2013.01); G06N 3/04 (2013.01); G06N 5/04 (2013.01)

(58) Field of Classification Search
CPC ............ G06N 3/04; G06N 3/08; G06N 3/082; G06N 5/04; G06F 8/443
See application file for complete search history.

(56) References Cited

U.S. PATENT DOCUMENTS

| 2019/0197403 A1* | 6/2019 | Schmidhuber ......... G06N 3/082 |
| 2020/0104715 A1* | 4/2020 | Denolf ...................... G06N 3/09 |
| 2020/0322868 A1* | 10/2020 | Claffey ................... H04L 45/48 |

FOREIGN PATENT DOCUMENTS

WO 2020/094995 A1 5/2020

OTHER PUBLICATIONS

Yang, Zhaohui, et al. "CARS: Continuous Evolution for Efficient Neural Architecture Search." arXiv preprint arXiv:1909.04977v6 (Mar. 9, 2020). (Year: 2020).*

(Continued)

*Primary Examiner* — William L Bashore
(74) *Attorney, Agent, or Firm* — Seed Intellectual Property Law Group LLP

(57) ABSTRACT

A method for building a neural network configured to be run on a destination computing unit is implemented by a system including a computer and a memory storing a learning dataset. The method includes providing a neural network having an initial topology, and training the initial topology over the learning dataset. The topology of the neural network is optimized, which includes at least one iteration of the following steps: for each of a plurality of candidate topological changes, estimating the variation induced by the candidate topological change on: the neural network's error, and a value of at least one physical quantity needed for executing the neural network on the destination processing unit, selecting at least one of the candidate topological changes based on said estimation and updating the topology of the neural network according to said selected topological change, and training the updated neural network over the learning dataset.

17 Claims, 5 Drawing Sheets

(56)     References Cited

OTHER PUBLICATIONS

Tan, Mingxing, et al. "MnasNet: Platform-Aware Neural Architecture Search for Mobile." arXiv preprint arXiv:1807.11626v3 (May 29, 2019). (Year: 2019).*
Hsu, Chi-Hung, et al. "Monas: Multi-objective neural architecture search using reinforcement learning." arXiv preprint arXiv:1806.10332v2 (Dec. 3, 2018). (Year: 2018).*
Woo et al., "Real-Time Optimal Power Flow Using Twin Delayed Deep Deterministic Policy Gradient Algorithm," *Digital Object Identifier 10.110*, 2020, 9 pages.

* cited by examiner

METHOD FOR BUILDING A RESOURCE-FRUGAL NEURAL NETWORK

BACKGROUND

Technical Field

The present disclosure relates to a method for building a resource-efficient neural 7particular application when the generated neural network is used in the field of IoT (Internet of Things) in which sensors comprise processing means and remote communications means in order to acquire, sometimes process, and transfer acquired data to a remote gateway. Indeed, in that situation sensors are expected to exhibit high reliability and duration, and hence require as less resource as possible.

Description of the Related Art

Artificial intelligence is a wide and quickly spreading field of endeavor, in which a main trend relies on so-called "big-data" and redundancy. According to this trend, neural networks inspired by the functioning of the biological brain and the redundancy between biological neurons, have been developed with huge amounts of layers of neurons and links between them. In order to train such neural networks, important resources are needed and in particular very large quantity of training data, important computational resources and long training time.

Once trained, execution of this type of neural network is also computationally intensive since it requires important amounts of energy and memory capacity. For this reason, those neural networks are hardly implementable in a context where energy and computational resources are limited, such as systems which energy is provided by batteries.

In particular, in the field of so-called Internet of Things or IoT, a sensor is expected to operate reliably for a long time before any maintenance intervention is required. Currently, sensors in the field of IoT are used for acquiring data, optionally performing a local processing of the acquired data, such as selection, filtering, format conversion, etc., and for transferring data to remote servers in the cloud which can implement more complex or computationally-intensive processing. In other implementations, in the field of so-called edge computing, data transferred by a sensor can be processed by a gateway prior to being sent to the cloud. In this case also, the resource constraints on the gateway are lower, especially the availability of electricity since a gateway is not powered by a battery. Accordingly, it is easier to implement complex or computationally-intensive processing.

Last, in some implementations, a sensor can also be configured to execute an artificial intelligence model such as a pre-trained neural network on the acquired data prior to transferring them. It may even be configured to occasionally update the IA model it implements by an additional learning. In this latter case, it is required that the AI model be as less resource-intensive as possible for both its execution as for its training.

The present applicant already disclosed in WO2020094995 a breakthrough technique for generating a parsimonious neural network; which is a neural network having lighter structure although being more efficient, for instance for simulation applications, than in the prior art. Said neural network also requires much less training data. In particular, this document introduces a technique of "topological gradient," according to which the construction of the neural network is performed by iteratively selecting the topological changes of the network that provide the best increase in the network precision. This increase is estimated over candidate topological changes without the need for actually performing the topological change and training the neural network incorporating this change, which allows for a great reduction in learning time while optimizing the structure of the network as regards its precision.

According to this method, the only criterion that is taken into account for building the network is its precision (corresponding to an amount of errors). In some context and in particular the context of IoT, available resources can be more critical than the precision of the implemented network. There is therefore a need for a method enabling building a neural network while taking into account the context and restrictions of its implementation.

BRIEF SUMMARY

In view of the above, the purpose of the disclosure is to provide a method for building a neural network that optimizes the topology and performance of the network according to available resources of the processing unit which is intended to run the network.

Another aim of the disclosure is to allow building neural networks that provide both increased precision and reduced needs in terms of physical resources such as energy, memory capacity or execution time.

Another aim of the disclosure is to increase the autonomy of a connected sensor belonging to an IoT architecture, and/or optimize the quantity of data that such sensor can process and transfer.

Accordingly, it is disclosed a method for building a neural network intended to be run on a destination computing unit, the method being implemented by a system comprising a computer and a memory storing a learning dataset, the method comprising:
  providing a neural network having an initial topology comprising an input layer, a hidden layer, and a set of output nodes, and training said initial topology over the learning dataset, and
  optimizing the topology of the neural network,
  wherein optimizing the topology of the neural network comprises at least one iteration of the following steps:
    for each of a plurality of candidate topological changes, estimating the variation induced by the candidate topological change on :
      the neural network's error, and
      a value of at least one physical quantity needed for executing the neural network on the destination processing unit,
    selecting at least one of the candidate topological changes based on said estimation and updating the topology of the neural network according to said selected topological change, and
    training the updated neural network over the learning dataset.

In embodiments, the at least one physical parameter related to the execution of the neural network on the destination processing unit includes at least one of:
  an energy consumption of the destination processing unit for each inference of the neural network,
  a memory capacity requirement of the destination processing unit for each inference of the neural network, and
  a time required by the destination processing unit for each inference of the neural network.

In embodiments, the estimation step for a given candidate topological change comprises estimating the variation induced by the candidate topological change on a cost function formed as a weighted sum of:

- a term representative of the best error e of the neural network obtainable by the neural network incorporating the candidate topological change on the training dataset, and
- at least one penalty term corresponding to each respective physical quantity exceeding a corresponding maximum value.

The penalty term may correspond to a physical quantity is the positive part of the difference between a value of the physical quantity required for executing the neural network incorporating the candidate topological change and the corresponding maximum value.

In embodiments, each candidate topological change is either additive or subtractive,

- an additive topological change including addition of at least one node and/or link between two nodes, or, if the neural network is a convolutional neural network, addition of at least one tensor and/or convolutional kernel,
- and a subtractive topological change comprising removal of at least one node and/or link between two nodes, or, if the neural network is a convolutional neural network, removal of at least one tensor and/or convolutional kernel.

In embodiments, the method comprises selecting at least one additive candidate topological change maximizing a diminution of the cost function over all candidate topological changes and, if no additive candidate topological change provides a diminution of the cost function, selecting at least one subtractive candidate topological change minimizing the increase of the cost function.

In embodiments, estimating the variation induced by a candidate topological change on the neural network's precision comprises estimating the best error obtainable by the neural network incorporating the candidate topological change on the training dataset, by computing the Lagrangian of the neural network including the candidate topological change.

In embodiments, the neural network is scalar, the destination processing unit is devoid of a graphical processing unit GPU, and estimating the variation induced by addition or deletion of a connection between two nodes on the value of said at least one physical quantity comprises:

- if the physical quantity comprises an energy consumption of the CPU, computing the energy consumption variation as $\delta E = \pm c_E n$,
- if the physical quantity comprises a memory capacity of the CPU, computing the memory capacity variation as $\delta M = c_M (\delta |W|_0 + n \delta |X|_0)$,
- if the physical quantity comprises a time required for executing the neural network, computing the time variation as $\delta T = \pm c_T n$, where $c_E$, $c_M$, $c_T$ are constants related to the destination processing unit, $\delta |W|_0$ and $\delta |X|_0$ are respectively the variation of the number of links and of the number of cells and n is a number of samples of input data to evaluate simultaneously using the neural network.

In embodiments, the neural network is scalar, the destination processing unit comprises a graphical processing unit GPU comprising a number $n_p$ of processors, and estimating the variation induced by addition or deletion of a connection between two nodes on the value of said at least one physical quantity comprises:

- if the physical quantity comprises an energy consumption of the GPU, computing the energy consumption variation as $\delta E = \pm c_E$,
- if the physical quantity comprises a memory capacity of the GPU, computing the memory capacity variation as $\delta M = c_M (\delta |W|_0 + n \delta |X|_0)$,
- if the physical quantity comprises a time required for executing the neural network, computing the time variation as $\delta T = \pm c_T$ where $c_E$, $c_M$, $c_T$ are constants related to the GPU, $\delta |W|_0$ and $\delta |X|_0$ are respectively the variation of the number of links and of the number of cells, and n is the number of samples of input data that can be simultaneously processed by the neural network, n being determined by:

$$M(\Gamma, n) \leq M_{max},$$

and $$n \leq n_p$$

with $M_{max}$ the maximum memory capacity needed for one execution of the neural network.

In embodiments, the neural network is convolutional, the destination processing unit is devoid of a graphical processing unit GPU, and estimating the variation induced by a candidate topological change on the value of said at least one physical quantity comprises:

- if said candidate topological change is addition or removal of a convolution kernel,
  - if the physical quantity comprises an energy consumption of the CPU, computing the energy consumption variation as $\delta E = \pm c_E n |X_f|_0 \cdot |k|_0$,
  - if the physical quantity comprises a memory capacity of the GPU, computing the memory capacity variation as $\delta M = \pm c_M \cdot |k|_0$
  - if the physical quantity comprises a time required for executing the neural network, computing the time variation as $$\delta T = \pm c_T n |X_f|_0 \cdot |k|_0$$

where $|X_f|_0$ is the number of non-null elements of the output layer of the added or removed convolution kernel, n the number of samples of input data that can be simultaneously processed by the neural network, with $M(\gamma, n) \leq M_{max}$, where $M_{max}$ is a maximum memory capacity needed for one inference of the neural network, and $|k|_0$ is the number of non-zero elements of the added or removed convolution kernel, and $c_E$, and $c_T$ are constants related to the CPU, and

- if said candidate topological change comprises addition or removal of a tensor $X_n$ located between a previous tensor $X_p$ and followed by at least another tensor $X_f$, and of a first convolutional layer for computing $X_n$ out of $X_p$ and a second convolutional layer for computing $X_f$ out of $X_n$,
  - if the physical quantity comprises an energy consumption of the CPU, computing the energy consumption variation as $$\delta E = +c_E n (|k_n|_0 \cdot |X_n|_0 + |k_f|_0 \cdot |X_f|_0)$$

- if the physical quantity comprises a memory capacity of the GPU, computing the memory capacity variation as $$\delta M = \pm c_M (|k_n|_0 + |k_f|_0 + n |X_n|_0)$$

- if the physical quantity comprises a time required for executing the neural network, computing the time variation as $$\delta T = \pm c_T n (|k_n|_0 \cdot |X_n|_0 + |k_f|_0 \cdot |X_f|_0).$$

In embodiments, the neural network is convolutional, the destination processing unit comprises a graphical processing unit GPU comprising a number $n_p$ of processors, and estimating the variation induced by a candidate topological change on the value of said at least one physical quantity comprises:

if said candidate topological change is addition or removal of a convolution kernel, if the physical quantity comprises an energy consumption of the GPU, computing the energy consumption variation as $$\delta E = \pm c_E |X_f|_0 \cdot |k|_0,$$

if the physical quantity comprises a memory capacity of the GPU, computing the memory capacity variation as $$\delta M = \pm c_M \cdot |k|_0$$

if the physical quantity comprises a time required for executing the neural network, computing the time variation as $$\delta T = \pm c_T |X_f|_0 \cdot |k|_0$$

where $|X_f|_0$ is the number of non-null elements of the output layer of the added or removed convolution kernel, n the number of samples of input data that can be simultaneously processed by the neural network, with $$M(\gamma, n) \le M_{max} \text{ and } n \le n_p, \quad |k|_0$$

is the number of non-zero elements of the added or removed convolution kernel, and $c_E$, and $c_T$ are constants related to the GPU, and if said candidate topological change is addition or removal of a tensor $X_n$ located between a previous tensor $X_p$ and followed by at least another tensor $X_f$, and of a first convolutional layer for computing $X_n$ out of $X_p$ and a second convolutional layer for computing $X_f$ out of $X_n$, if the physical quantity comprises an energy consumption of the GPU, computing the energy consumption variation as $$\delta E = c_E(|k_n|_0 \cdot |X_n|_0 + |k_f|_0 \cdot |X_f|_0)$$

if the physical quantity comprises a memory capacity of the GPU, computing the memory capacity variation as $$\delta M = \pm c_M(|k_n|_0 + |k_f|_0 + n|X_n|_0)$$

if the physical quantity comprises a time required for executing the neural network, computing the time variation as $$\delta T = \pm c_T(|k_n|_0 \cdot |X_n|_0 + |k_f|_0 \cdot |X_f|_0).$$

In embodiments, the neural network comprises at least a compressor block adapted to generate compressed data out of input data and a decompressor block adapted to decompress the data compressed by the compressor block, wherein the method comprises at least one topology optimization step implemented on the compressor block and decompressor block, followed by at least one training step of the whole neural network with fixed topology.

The compressor block and decompressor block of the neural network may be intended to be run on distinct destination processing units, and the training step of the whole neural network comprises minimizing a cost function J being a convex combination of a cost function $J^c$ of the compressor block on its respective destination processing unit and a cost function $J^d$ of the decompressor block on its respective destination processing unit:

$$J = \alpha J^c + (1-\alpha) J^d$$

where alpha is a weighting parameter and each cost function of the compressor block and decompressor block is a weighted sum of:

a term representative of the best error e of the respective block of the neural network obtainable by the neural network at the fixed topology of the training step, and at least one penalty term representative of a respective physical quantity, needed for executing the respective block on the respective destination processing unit, exceeding a determined threshold, each threshold depending on the destination processing unit of the respective block of the neural network.

It is also disclosed:

a computer program product comprising code instructions for implementing the method according to the description above, when it is executed by a computer, a computer configured for implementing said method.

A computer implemented neural network, obtained by implementation of said method.

a processing unit configured for implementing such neural network, or for implementing either a compressor block or decompressor block of such a neural network.

In embodiments, a sensor is also disclosed, comprising a sensing element adapted to acquire data, a communication interface with a remote computing device, and a processor, wherein the sensor is configured for implementing a compressor block of a neural network obtained by implementing the method disclosed above in order to compress data acquired by the sensing element, and to transfer the compressed data to the remote computing device.

In embodiments, a computing device is also disclosed, comprising a processor and a communication interface with at least one remote sensor, wherein the computing device is configured for receiving compressed data transferred by a remote sensor, and for implementing a decompressor block of a neural network obtained by implementing the method disclosed above in order to decompress said data.

It is also proposed an Internet of Things architecture comprising:

a plurality of sensors, wherein each sensor comprises a sensing element adapted to acquire data, a remote communication interface and a sensor processor, and an IoT platform comprising a remote communication interface and a processor, wherein each sensor is configured for implementing a compressor block of a neural network obtained by implementing the method disclosed above in order to compress acquired data, and transfer said data to the IoT platform, and the IoT platform is configured for implementing the decompressor block of said neural network in order to decompress the data compressed and transferred by the sensor.

In embodiments, the Internet of Things architecture further comprises a memory configured to receive, from each sensor, compressed acquired data, to store said compressed acquired data and to transfer said compressed acquired data to the remote computing device.

The claimed method enables building a parsimonious neural network such that the physical resources needed for its execution on a destination processing unit are known and controlled. Moreover, thanks to the proposed method, the topology of the neural network is optimized in order for the neural network to exhibit minimum error while respecting one or several constraints on the physical resources needed for its execution. The physical resources include for instance the memory capacity of the processing unit, the energy consumption, or the time needed by the processing unit to evaluate the neural network.

The topology of the neural network is thus optimized with regards to its destination and to its destination processing unit.

In particular, in the field of the Internet of Things in which a sensor must use as little energy as possible in order to exhibit longer autonomy, the claimed method is of particular use. It enables building a neural network for compression and decompression of data, where the compression part can be executed with little energy and memory capacity by a sensor in order to compress data acquired by said sensor. The sensor can then transfer said compressed data to a gateway for further processing without consuming much energy or memory capacity since the data is compressed.

Another advantageous application of the method relates to embedded systems in which a response must be computed in real time. In this kind of context, the neural network may be built with a heavy constraint on the time needed for its execution.

BRIEF DESCRIPTION OF THE SEVERAL VIEWS OF THE DRAWINGS

Other features and advantages of the disclosure will be apparent from the following detailed description given by way of non-limiting example, with reference to the accompanying drawings, in which.

DETAILED DESCRIPTION

Computing Devices

Figure 1A:
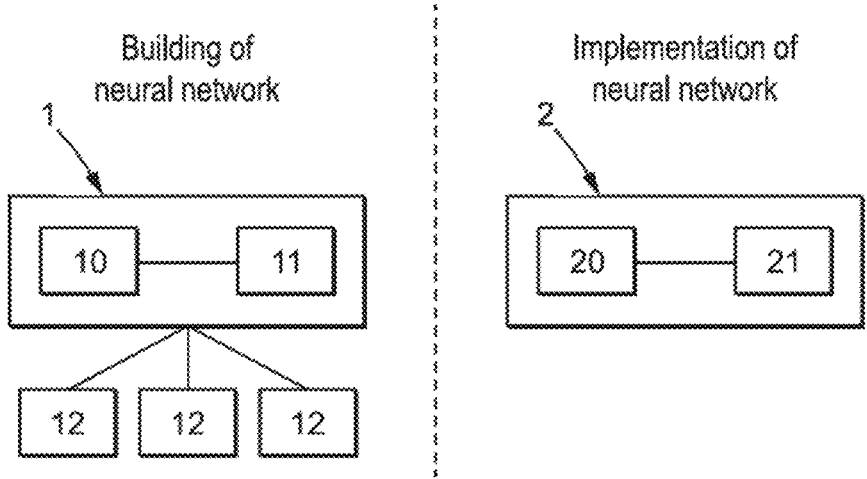
FIG. 1a schematically represents computing means that can respectively implement the method for building a neural network and the obtained network according to an embodiment.

A method for building a neural network intended to be run on a destination computing unit 2 will now be described. With reference to FIG. 1a, the destination computing unit 2 comprises a processing device 20 which is intended to implement all or part of the neural network once the latter is built. The destination computing unit may also comprise a memory 21 storing the configuration of the neural network to be executed.

In all that follows, the words "execution," "assessment" and "inference" of a neural network are used as synonyms to designate the use of a trained neural network fed with input data to output a desired output corresponding to said input data.

The processing device 20 of the destination computing unit 2 can in particular include a central processing unit CPU, comprising at least one processor, microprocessor, controller or microcontroller. The processing device 20 can include at least one graphical processing unit GPU, or may be devoid of any GPU, or in other words may not comprise any GPU.

In embodiments, the destination computing unit 2 may be a sensor or so-called connected sensor, such as a sensor belonging to an Internet of Things architecture. Such a sensor comprises a sensing element, configured to acquire data, for instance data representative of a physical quantity or of a change in a physical quantity, a sensor processor, a sensor memory, and a communication interface, which may be a remote communication interface. In the case where the destination computing unit 2 is a sensor, the sensor processor and sensor memory can form respectively the processing device and memory of the destination computing unit.

In other embodiments, the destination computing unit may be embedded inside a vehicle.

Figure 1B:
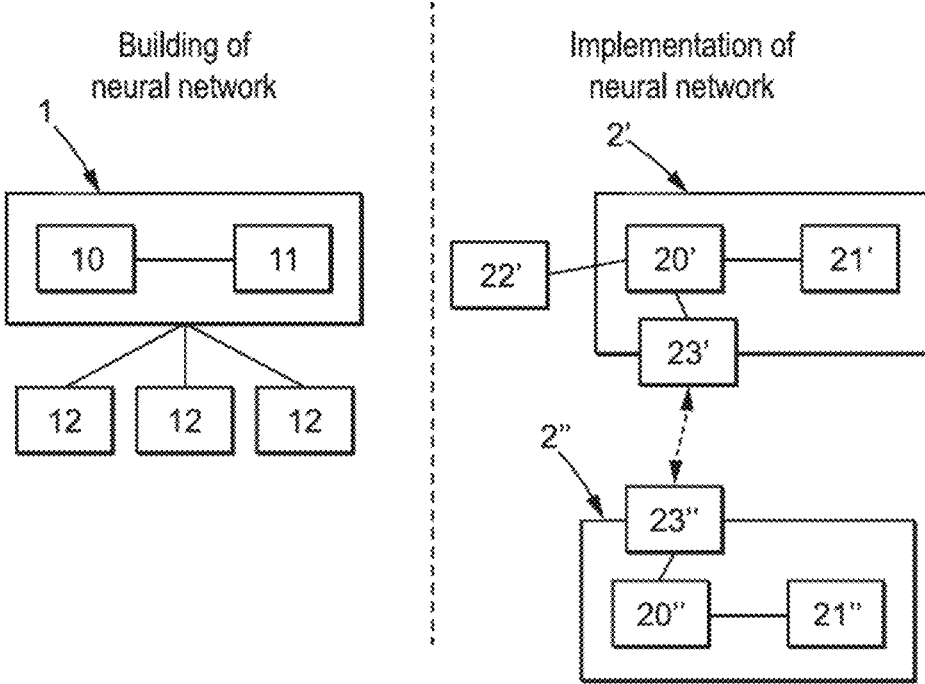
FIG 1b schematically represents computing means that can respectively implement the method for building a neural network and the obtained network according to another embodiment.

In still other embodiments, and as schematically shown in FIG. 1b, the implementation of the neural network may be distributed among two or more destination computing units, 2', 2" such as for instance a sensor 2' and a platform 2" of an IoT architecture, such as a gateway or a server. The sensor 2' in that case comprises a processing device 20', a memory 21', a sensing element 22' adapted to collect data, and an interface 23' for communication with the destination computing unit 2". In embodiments, this interface 23' may be a remote communication interface, enabling to transmit data to the destination computing unit 2" through a telecommunication network R.

The other destination computing unit 2" may also include a processing device 20", a memory 21" and a communication interface 23".

The execution, by the destination computing unit 2, of a neural network requires computing resources such as:

Energy consumed by the destination computing unit for the execution of the neural network, Elapsed time by the neural network for one assessment, or Amount of memory necessary for one assessment of the neural network.

These physical quantities depend both on the topology neural network and on the destination computing unit 2. Moreover, depending on the application and context of use of the neural network, the availability of those physical quantities may be constrained. For instance, in a context where the destination computing unit is a sensor whose energy is provided by a battery, the energy needed to execute the neural network shall be as low as possible.

The method described below takes into account the consumption of resources needed by the destination computing unit for executing the neural network, as well as potential constraints on those resources, during the building of the neural network. Accordingly, the obtained neural network is adapted for the task for which it has been trained, and exhibits a topology which ensures that the constraints of the destination computing unit in terms of resource consumption are respected.

In the case where the implementation of the neural network is distributed among two or more destination computing units, and as detailed in an example below, the building of the network may take into account the resource needed by each destination computing unit for the respective part of the network that it executes.

Back to FIGS. 1*a* and 1*b,* the method for building the neural network is implemented by a system 1 comprising a computer 10 and a memory 11 storing a learning dataset, and code instructions for implementing the method. The computer 10 may include one or several processor(s), microprocessor(s), controller(s) or microcontroller(s). In embodiments, the system 1 is distinct from the destination computing unit 2, which means that the construction of the neural network and its execution are performed on different computing devices. However, this may not be the case and the computer 1 building the neural network may be the same as the destination computing unit 2 executing said network.

In embodiments, the computer 1 may include or be connected to sensors 12 adapted to acquire data, such as data representative of physical quantities, which are used to form the training dataset. Data output by such sensors can typically be selected, sorted, processed, labelled, to form a relevant training dataset for a given application.

Neural Network

The neural network that is built in accordance with the method described below comprises a set of processing nodes, also called neurons, and connections between neurons, where each connection is weighted by a weighting coefficient. The neurons and the connections between them thereby form a topology organized in successive layers.

The neural network is a feed-forward neural network, which means that it does not comprise any loop connecting the output of a neuron to the input of a neuron of a same layer or of a previous layer.

The neural network can either be scalar, i.e., formed as explained above by a number of neurons and links between them, or convolutional. In that latter case, neurons are replaced by tensors, and links are replaced by convolution kernels. The order of the tensors may vary depending on the nature of input data:

1 for input data corresponding to 1D signal such as a signal depending only on time, 2 for 2D input data such as images, 3 for 3D input data such as videos, 4 or more for more complex input data. For instance weather forecast can be expressed by 4D data (three dimensions for space and one for time) and need 4-order tensors.

In any case, the neural network can be seen as a function $f_{\Gamma,w}$ such as:

$$y = f_{\Gamma,w}(x) \tag{1}$$

where y and x are respectively the input and output of the neural network, $\Gamma$ is the topology of the neural network and W is a matrix or a list of matrices of the weights of each connection within the network.

According to a non-limiting example, the neural network can be a digital twin of a real system, which state can be measured by sensors able to measure physical quantities. In such case, x and y are physical quantities representing the state of the system.

According to another non-limiting example, described in more details below, the neural network may comprise a compressor block and decompressor block, adapted to successively compress and decompress input data. In that case, the neural network computes a function of the type x=f(x).

The learning dataset comprises data of the type $(x_i, y_i)_{i=1}^{N}$ where:

$x_i \in \Re^{n_0}$ is an input piece of data comprising a number $n_0$ of components, and $y_i \in \Re^{n_0}$ is an output piece of data comprising a number no of components. These values can have been acquired by sensors or simulated. The training dataset may be distributed into two distinct subsets which are used respectively for the training and validation of the neural network, as well known by the person skilled in the art.

The error e of the neural network may be defined as follows:

$$e(\Gamma, W) = \sum_{i=1}^{N} \|f_{\Gamma,W}(x_i) - y_i\|^2,$$

The error quantifies a difference between the output of the neural network and the actual expected value of said output. The error e can be computed on the training subset or validation subset of data.

In embodiments, a layer of neurons is defined as a set of neurons which can be computed simultaneously, and the neural network is built such that the input of a neuron can be connected to the output of a neuron of any of the previously computed layers. In that case, the set of the neurons computing the output of the neural network does not actually form an output layer, but instead a set of output nodes, because the computation of the outputs of the neural network may be distributed over neurons belonging to different layers.

It is then denoted $X_i$, i=1, . . . nl the layer formed by the neurons which can be simultaneously computed during a step i, and the layers computed until step i are denoted: $X^i = (X_0, \ldots, X_i)$. The set of all layers of the neural network is denoted X. It is also noted by $X_0 = (x_i)_{i=1}^{N}$, the input data for the training of the neural network, and the target output data corresponding to said input data is $Y = (y_i)_{i=1}^{N}$.

The computation algorithm implemented by the neural network on the input data $X_0$ is as follows:

$$X^0 = X_0$$

For i in [1, . . . , nl]

$$X_i = f(W_{i-1} * X^{i-1})$$

$$X^i = (X^{i-1}, X_i)$$

End $$X = X^{nl}$$

The function f is an activation function which can be defined as the identity function for the output nodes, and the ReLU function for the other nodes.

According to this architecture, the last component of the input data is a bias equal to 1. In classical architectures, each layer of neurons other than the output layer has a bias cell, but in accordance with this specific architecture, only the input layer comprises a bias cell, and the cells of all the other layers can be connected to that cell.

When the neural network is convolutional, then the connections of the matrix W are replaced by convolutional kernels, which include a plurality of connections.

The computation algorithm given above remains relevant with the function f being a maximum function and * corresponding to the convolution operation.

Method for Building the Neural Network

Figure 2A:
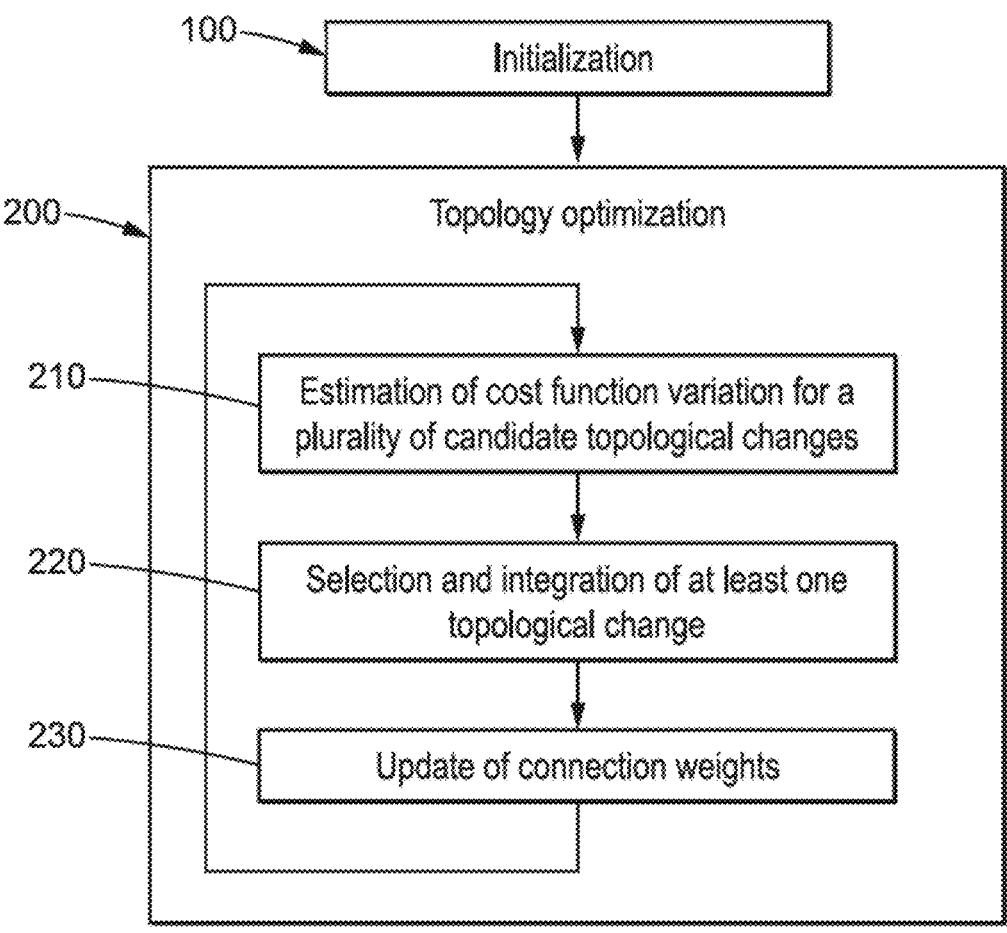
FIG. 2a schematically represents the main steps of a method for building a neural network according to an embodiment of the disclosure.
Figure 2B:
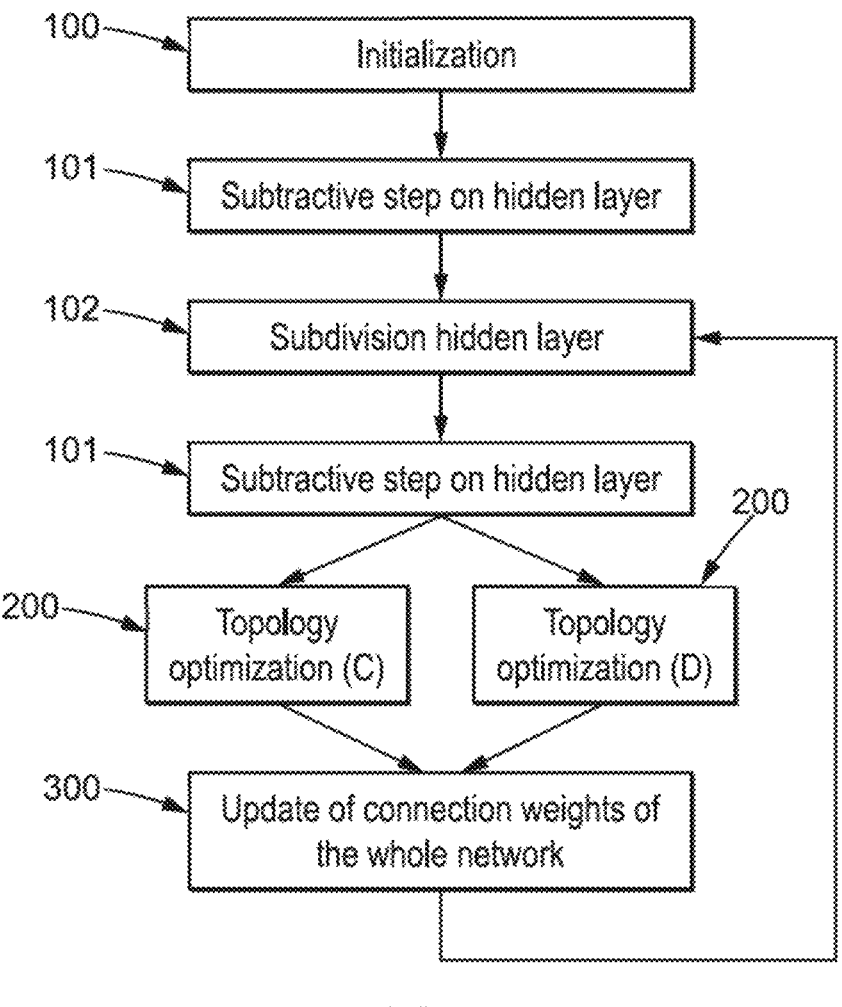
FIG. 2b schematically represents the main steps of a method for building a neural network comprising a compressor and a decompressor blocks.

With reference to FIGS. 2a and 2b, a method for building a neural network will now be disclosed.

As explained in more details below, the neural network is built in order to take into account at least one constraint on a physical quantity or resource needed in order to execute the neural network on the destination computing unit. In embodiments, the constraint may be to remain below a maximum value of said physical quantity. The constraint may also be to minimize said physical quantity required for executing the neural network.

In embodiments, the physical quantity can include the amount of consumed energy required by the destination computing unit to execute the neural network. In cases where the destination computing unit is a sensor comprising a microcontroller powered by a battery, the amount of consumed energy must be kept as low as possible.

In other embodiments, the physical quantity can include the amount of memory requirement for executing the neural network ("inference memory requirement"). This parameter is also very important when the destination computing unit is a sensor with limited memory capacity.

In other embodiments, the physical quantity can include the elapsed time for executing the neural network ("inference elapsed time"). When the destination computing unit is an embedded real time system, this parameter is of primary importance.

In embodiments, at least two or even the three parameters presented above are taken into account in the building of the neural network.

The description of the method will be made with reference to an example in which the building of the neural network is implemented in order to take into account constraints on the following three physical quantities needed for executing said network:

Energy consumed by the destination computing unit for one inference of the neural network on a data sample,
  Inference elapsed time, or
  Inference memory requirement.

This example is thus not limiting and some implementations of the method can take into account other resources, or only part of those resources.

According to this example, the topology of the neural network needs to solve the following constrained optimization problem:

$$
\begin{cases}
\min_{\Gamma, W} e(\Gamma, W), \text{ such that} \\
E(\Gamma, n) - E_{max} \leq 0 \\
M(\Gamma, n) - M_{max} \leq 0 \\
T(\Gamma, n) - T_{max} \leq 0
\end{cases} \tag{1}
$$

Where:

$E(\Gamma, n)$ is the amount of energy consumed by the destination computing for a number n of inferences of the neural network, and $E_{max}$ is a maximum value that cannot be exceeded,
  $M(\Gamma, n)$ is the amount of memory capacity needed for an inference of n input samples and $M_{7\text{-}flax}$ is a maximum value that cannot be exceeded,
  $T(\Gamma, n)$ is the amount of time required for a number n of inferences of the neural network, and $T_{max}$ is a maximum value that cannot be exceeded.
  n can be equal to 1 if the neural network is intended to be run on the fly on each new input data, for example for real-time applications. In other embodiments, the goal may be to increase the flow of data processed by the neural network. In that case n is greater than 1 and $T(\Gamma, n)/n$ should be as small as possible.

Also, $E_{max}$, $T_{max}$, and $M_{max}$ can be adjusted during the construction of the neural network by the user of the method in order to make them as small as possible.

In order to take into account those resource constraints, a cost function J of the neural network is introduced, which will be minimized during construction and training of the neural network. This cost function takes into account:

The error e of the neural network, and
  An amount of at least one of the physical quantities presented above, needed by the destination computing unit, for evaluating the neural network, or an amount of the physical quantity requirement exceeding a predefined maximum value in said physical quantity.

The cost function can be expressed in different manners according to the pursued targets of construction of the neural network.

For instance, the cost function may be expressed as a weighted sum of:

a term representative of the best error e of the neural network obtainable by the neural network incorporating the candidate topological change on the training dataset, and
  a term representative of each physical quantity needed for executing the neural network on the destination computing unit and which is taken into account in the building of the network.

In embodiments, each term representative of a physical quantity may be a penalty term corresponding to the part of a respective physical quantity exceeding a corresponding predetermined maximum value. This penalty term can be computed as the positive part of the difference between the value of the physical quantity required for executing the neural network and the corresponding predefined maximum value.

The optimization problem (1) given above may in that case correspond to the following cost function:

$$
J(\Gamma, W, n) = e(\Gamma, W) + \lambda_E (E(\Gamma, n) - E_{max})^+ + \lambda_M (M(\Gamma, n) - M_{max})^+ + \lambda_T (T(\Gamma, n) - T_{max})^+ \tag{2}
$$

Where $\lambda_E$, $\lambda_M$ and $\lambda_T$ are positive weighting coefficients, and $( )^+$ is the positive part function. The $\lambda_i$ can be increased or diminished according to the relative importance that one wishes to attribute to each criterion.

According to this definition, the requirements in physical quantities such as energy, time and memory, have no effect as long as their corresponding constraints are satisfied, and in that case the cost function turns down to an error function.

According to an alternative definition, J may be defined as follows:

$$
J(\Gamma, W, n) = \\
e(\Gamma, W) - \varepsilon_E \ln\left(\frac{E_{max} - E(\Gamma, n)}{E_{max}}\right) - \varepsilon_M \ln\left(\frac{M_{max} - M(\Gamma, n)}{M_{max}}\right) \\
- \varepsilon_T \ln\left(\frac{T_{max} - T(\Gamma, n)}{T_{max}}\right) \tag{3}
$$

Where $\varepsilon_E$, $\varepsilon_M$ and $\varepsilon_T$ are positive and small weighting coefficients. According to this definition, the error is not defined if the constraints are not satisfied.

In order to give more weight to a resource criterion, one can choose to take into account said resource even if the corresponding constraint is satisfied. In that case, some or each term corresponding to a respective physical quantity can express the absolute value of the physical quantity needed for executing the neural network on the destination computing unit.

This provides the following other example of definition of the cost function J:

$$J(\Gamma, W, n)=e(\Gamma, W)+\lambda_E E(\Gamma, n)+\lambda_M$$
$$(M(\Gamma, n)-M_{max})^+ +\lambda_T (T(\Gamma,n)-T_{max})^+ \qquad (4)$$

In this example, the energy consumed by the destination computing unit has a role similar to that of the error of the neural network. Therefore, even if the energy remains below the prescribed maximum value, the training of the network will aim at minimizing this resource.

With reference to FIG. 2a, the method comprises a first step 100 of initialization of a neural network having an initial topology. The initial topology can be minimal, for instance including:

An input layer comprising a set of input nodes, where the number of input nodes is set as the number no of components of the input data, including the bias node, At least one hidden layer comprising at least one node, and A set of output nodes selected among the nodes of the network, wherein the output of the neural network is formed by the outputs of said nodes. The set of output nodes comprises no nodes corresponding to the number of components of the output data. Accordingly, this topology does not formally comprise an output layer, since any node belonging to a hidden layer may be an output node.

For convolutional neural networks, the initial topology may include:

An input layer being an input tensor,

A set of output nodes, wherein the output of an output node is an output of the neural network, and If the set of output nodes is a tensor, then the initial topology may include a convolutional kernel connecting the input tensor to the output nodes. Otherwise, the initial topology of the network may be a tree network comprising a succession of tensors reducing at each level the size of the input layer by a factor 2, in each dimension.

The initialization step 100 also comprises determining the optimal connection weights $W^{1*}$ for the initial topology $\Gamma^1$, the optimal connection weights being the weights minimizing the error function $e(\Gamma^1, W^{1*})$ of the neural network on the learning dataset. Thus at this step the physical resources needed by the network can be ignored. This step is performed by training the initial topology of the neural network on the training subset of the learning dataset.

To this end, one can implement the well-known method of gradient backpropagation.

The method then comprises at least one phase of optimization 200 of the topology of the neural network, which aims at changing the topology of the neural network in order to minimize the cost function J introduced above.

The optimization phase 200 includes implementing at least one topological change 220 of the neural network which can include:

At least one additive topological change, which can include the addition of a neuron and/or a link between two neurons, or in the case of a convolutional layer, addition or at least one tensor and/or convolutional kernel, and/or At least one subtractive topological change, which can include deletion of at least one neuron and/or link between two neurons, or in the case of a convolutional approach, deletion of at least one tensor and/or convolutional kernel.

Moreover, each topological change is selected among a plurality of candidate topological changes. For each candidate topological change, the variation induced by said candidate topological change on the cost function of the neural network, with respect to the previous topology of the neural network, is evaluated during a substep 210. The selected candidates are the ones that give the best variation of the cost function J.

The aim of the optimization phase is to minimize the cost function of the neural network. Hence, the selection of a candidate topological change mostly aims at maximizing the reduction of the cost function of the network. However, in some cases all candidate topological changes, and in particular all candidate subtractive topological changes may induce an augmentation of the cost function J on the training subset of the learning dataset.

In that case, a subtractive topological change may be selected, which lightly increase the cost function on the training subset of the learning dataset, but which reduces the error of the network on the validation subset of the learning dataset.

Therefore, in a nutshell, the selection 220 of a candidate topological change may be implemented as such:

Selecting the additive candidate topological change inducing the largest diminution of the cost function of the neural network on the training subset of the learning dataset, and If no candidate topological change induces a diminution of the cost function of the neural network, selecting a subtractive topological change inducing the lowest increase in the cost function of the neural network on the training subset of the learning dataset, and Ending the topological optimization of the neural network when no candidate topological changes induces a decrease in the cost function of the neural network, neither on the training subset nor on the validation subset of the learning dataset.

In order to estimate the variation induced by a candidate topological change on the neural network, it is not necessary to actually implement said candidate topological change and perform a training of the updated version of the network until the connection weights of the network are optimum for this technology. This would require too much time and computational resources.

Instead, this variation of the cost function induced by a candidate topological change is estimated. Let us note δJ the variation of the cost function induced by a candidate topological change δΓ. The variation of the cost function can be expressed as follows:

$$\delta J(\Gamma^n, W^{n*})=J(\Gamma^n, W^{n*})-J(\Gamma^{n-1}, W^{n-1*}) \qquad (5)$$

Where * still denotes the optimal connection weights for a given topology, i.e., the connection weights minimizing the cost function J at said topology, and n and n–1 refer to successive topologies of the neural network.

As indicated above, the cost function J may be expressed in a number of different ways, and as a consequence, the variation δJ may also be rewritten in different ways.

For instance δJ may be rewritten into:

$$\delta J(\Gamma^n, W^{n*})=\delta e(\Gamma^n, W^{n*})+\lambda_E \delta E(\Gamma^n)+\lambda_M \delta M(\Gamma^n)+\lambda_T \delta T$$
$$(\Gamma^n) \qquad (6)$$

In that case, a method for estimating the quantities $\delta E$, $\delta M$ and $\delta T$ is given below.

According to another example, $\delta J$ may be rewritten into:

$$\delta J(\Gamma^n, W^{n*}) = \delta e(\Gamma^n, W^{n*}) + \lambda_E (E(\Gamma^n, n) - E_{max})^+ - \lambda_E (E(\Gamma^{n-1}, n-1) - E_{max})^+ + \lambda_M (M(\Gamma^n, n) - M_{max})^+ - \lambda_M (M(\Gamma^{n-1}, n-1) - M_{max})^+ + \lambda_T (T(\Gamma^n, n) - T_{max})^+ - \lambda_T (T(\Gamma^{n-1}, n-1) - T_{max})^+ \tag{7}$$

In that case, a method for estimating the variation of E, M and T is given below.

Estimation of Error Variation Induced by a Topological Change

The estimation of $\delta e(\delta^n, W^{n*}) = e(\delta^n, W^{n*}) - e(\Gamma^{n-1}, W^{n-1*})$ can be performed without calculating the neural network in an updated topology $\Gamma^n$ by application of the so-called topological gradient method, which has been introduced in WO/2020/094995, and which main steps are reproduced below. One can nevertheless refer to this patent application for additional demonstrations and details regarding the following results and the estimation of error variation.

Estimation of the error variation between the updated topology $\Gamma^n$ and the previous topology $\Gamma^{n-1}$ is performed by computing the Lagrangian $\mathcal{L}$ of the neural network:

$$\mathcal{L}(\Gamma, W, X, \Lambda) = J(\Gamma, W) + \Sigma_i(\Lambda_i, (X_i - f_i(W_{i-1} Z^{i-1}))) \tag{8}$$

Where:

$\Lambda = \{\Lambda_i\}$ is the set of Lagrangian multipliers $\Lambda_i$, each $\Lambda_i$ having the same size as $X_i$ (u,v) is the dot product of u and v, two matrices having the same structure (which is the case of $\Lambda_i$ and $X_i - f_i$ $(W_{i-1} X^{i-1})$, or more specifically the sum of the term by term products of the elements of u and v.

The multipliers $\Lambda_i$ are computed by a conventional gradient backpropagation method, as it is known that $\Lambda_i = \partial_{X_i} e(\Gamma, W)$.

The so calculated $\Lambda_i$ have a major property: the variation of the Lagrange operator with respect to the $X_i$ is zero. In other words, the Lagrange operator behaves as if $X_i$ had been eliminated locally. It follows that for any optimal $W^{n-1*}$, obtained at step $n-1$, and the corresponding $X_{W^{n-1*}}$, and $\Lambda_{W^{n-1*}}$, an estimation of the error can be computed, for any W close to $W^{n-1*}$ $$J(\Gamma, W) \sim \mathcal{L}(\Gamma, W, X_{W^{n-1*}}, \Lambda_{W^{n-1*}}) \tag{9}$$

For a candidate topological change at iteration n, one can therefore estimate the variation of the network's error e between the topology $\Gamma^n$ updated according to the candidate topological change and the previous topology $\Gamma^{n-1}$ by computing the following quantity:

$$\mathcal{L}(\Gamma^n, W^n, X_{W^{n-1*}}, \Lambda_{W^{n-1*}}) - J(\Gamma^{n-1}, W^{n-1*}) \tag{10}$$

When the candidate topological change is subtractive, then $W^n = W_{|\Gamma^n}^{n-1*}$ is a restriction of $W^{n-1*}$ on the updated topology $\Gamma^n$.

When the candidate topological change is additive, $W^n$ is initialized with the same connection weights as $W^{n-1*}$ for the pre-existing connections, and with zero for each new connection created during the additive phase. Upon initialization, the variation of the error given by the previous equation is thus equal to zero, and in order to estimate the potential error variation, one can perform several training iterations and minimize the Lagrangian for the new connections only.

The estimation of the error variation given by equation (10) can be improved by:

Updating $W^n$ with one or two learning iterations at fixed $\Gamma^n$

Minimizing $\mathcal{L}(\Gamma^n, W^n, X_{W^{n-1*}}, \Lambda_{W^{n-1*}})$ with respect to $W^n$.

s can be understood from the definition given above of the cost function, which is a sum of terms corresponding respectively to the error and to each resource requirement of the network, the estimation of the error can be performed, for each candidate topological change, either separately and prior to estimating the impact of the topological change on the resource requirements, or together with said estimation.

Estimation of Resource Variations Induced by a Topological Change

The methods for estimating either the variations of E, M and T or their values for a given topology or candidate topology of the neural network will now be described. The consumption of energy, the memory capacity or the time required for executing the neural network depend on the type of destination computing unit, and on whether the neural network is of convolutional or scalar type.

Starting with a scalar neural network, the destination computing unit may be a computer processing unit devoid of a graphical processing unit GPU. In that case, Mmax may represent the size of the cache memory or the size of the central memory.

Each connection represents an operation of the "MAC" type (MAC standing for "Multiply and Accumulate") and hence the values and variations of energy, memory and time may be estimated in case of addition or subtraction of a connection as follows:

$$E(\Gamma, n) = c_E n |W|_0, \text{ and } \delta E = \pm c_E n \tag{11}$$

$$M(\Gamma, n) = c_M(|W|_0 + n|X|_0), \text{ and } \delta M = c_M(\delta |W|_0 + n \delta |X|_0) \tag{12}$$

$$T(\Gamma, n) = c_T |W|_0, \text{ and } \delta T = \pm c_T n. \tag{13}$$

Where $|W|_0$ and $|X|_0$, are respectively the number of links and of neural cells of the topology, n is the number of samples of input data to evaluate simultaneously using the neural network, and $c_E$, $c_M$ and $C_T$ are constant. In the expression of $\delta M$, we denote respectively by $\delta |W|_0$ and $\delta |X|_0$ the variation of the number of links and the number of cells of the network during either an additive or subtractive step. These variations can be either positive or negative.

It is here considered that the frequency of the CPU is constant. Considering the parameters $c_i$ as constants is an acceptable hypothesis as long as the memory $M(\Gamma, n)$ does not exceed $M_{max}$. For the sake of simplicity, it is also supposed that E and T are proportional to n. In fact, the increase of E and T are lower than n.

Addition and subtraction of a node can be easily derived from the preceding results based on the number of connections that are added or deleted.

When the destination computing unit includes a GPU, then one can consider implementing parallel execution of the neural network (SIMD context). In that case, the number n of samples of input data that can be simultaneously processed by the neural network is determined by the memory and the number of processors $n_p$ of the GPU:

$$M(\Gamma, n) \leq M_{max},$$

and $$n \leq n_p.$$

The elapsed time T for executing the neural network is proportional to the number of connections of the neural network (number of non-zero elements of W). Using the same notations as the CPU case, we obtain:

$$E(\Gamma, n)=c_E|W|_0, \text{ and } \delta E=\pm c_E \tag{14}$$

$$M(\Gamma, n)=c_M(|W|_0+n|X|_0), \text{ and } \delta M=c_M(\delta|W|_0+n\delta|X|_0) \tag{15}$$

$$T(\Gamma, n)=c_T|W|_0, \text{ and } \delta T=\pm c_T \tag{16}$$

If the neural network is convolutional, an additive step thus includes addition of at least a tensor and/or at least a convolutional kernel.

In the convolutional case, the amount of the energy, time or memory needed by the execution of the neural network on the destination computing unit is not readily computable based on the topography of the network, but can be estimated based on the variations $\delta E_i$, $\delta M_i$ and $\delta T_i$ induced at step:

$$E=E_0+\Sigma_{i\geq 1}\delta E_i \tag{17}$$

$$M=M_0+\Sigma_{i\geq 1}\delta M_i \tag{18}$$

$$T=T_0+\Sigma_{i\geq 1}\delta T_i \tag{19}$$

Where $E_0$, $M_0$, $T_0$ are the resource requirements of the initial topology of the neural network.

These quantities are estimated when $n\geq 1$ samples are processed simultaneously by the neural network on the destination computing unit. This number should not exceed the available memory capacity.

When the destination computing unit is devoid of a GPU, the number n of samples of input data that can be simultaneously processed by the neural network shall satisfy the following condition:

$$M(\Gamma, n)\geq M_{max}$$

In this context, the impact of the addition of a convolutional kernel k between two existing tensors can be estimated as follows.

First, the variation in the computational time $\delta T$ is proportional to the size of the n tensors $X_f$ to be computed by the convolutional kernel k:

$$\delta T=\pm c_T n|X_f|_0 \cdot |k|_0 \tag{20}$$

Where $|\cdot|_0$ is the number of non-zero elements and $X_f$ is the output tensor of the convolution.

The same applies for the energy consumption, which increases in the same proportions $$\delta E=\pm c_E n|X_f|_0 \cdot |k|_0 \tag{21}$$

The increase of the memory capacity needed for execution of the network is:

$$\delta M=\pm c_M \cdot |k|_0 \tag{22}$$

When a new tensor $X_n$ is added, this tensor is preceded by at least a preceding tensor $X_p$ and is also followed by at least another existing tensor $X_f$. Addition of the new tensor thus implies adding at least one new convolutional kernel $k_n$ allowing the computation of the new tensor from $X_p$ and at least one convolutional kernel $k_f$ allowing the computation of $X_f$ from the new tensor.

Addition or deletion of a tensor thus induces the following variations:

$$\delta T=+c_T n(|k_n|_0 \cdot |X_n|_0+|k_f|_0 \cdot |X_f|_0) \tag{23}$$

$$\delta E=+c_E n(|k_n|_0 \cdot |X_n|_0+|k_f|_0 \cdot |X_f|_0) \tag{24}$$

$$\delta M=+c_M(|k_n|_0 \cdot |k_f|_0+n|X_n|_0) \tag{25}$$

Therefore, the total amount of energy E, memory M and elapsed time T can be inferred by summing all contributions corresponding respectively to elementary changes in the topology of the convolutional neural network.

When the destination computing unit includes a GPU, the number n of samples of input data that can be simultaneously processed by the neural network is determined by:

$$M(\Gamma, n)\leq M_{max},$$

and $$n\leq n_p,$$

With $n_p$ is the number of processors of the GPU.

Addition or deletion of a convolutional kernel has an impact of the elapsed time:

$$\delta T=\pm c_T|X_f|_0 \cdot |k|_0 \tag{26}$$

One can make the hypothesis that a GPU has a set maximum power, and that the energy consumed by the GPU is directly linked to the elapsed time. Therefore, one can assume that the energetic consumption varies in the same proportions as the elapsed time:

$$\delta E=\pm c_E|X_f|_0 \cdot |k|_0 \tag{27}$$

The increase in memory capacity remains the same as the case where the destination computing unit is devoid of any GPU.

The impact of addition or deletion of a tensor can be evaluated in a similar manner as in the case where the destination computing unit is devoid of GPU (i.e., taking into account a convolutional kernel before and after the sampling unit), except that the elapsed time is independent of the number of processed samples n. Using the same notations as the CPU case, we obtain:

$$\delta T=\times c_T(|k_n|_0 \cdot |X_n|_0+|k_f|_0 \cdot |X_f|_0) \tag{28}$$

The consumed energy varies in the same proportions than the elapsed time:

$$\delta E=c_E(|k_n|_0 \cdot |X_n|_0+|k_f|_0 \cdot |X_f|_0) \tag{29}$$

The variation of the memory remains the same as the CPU case. Once a candidate topological change is selected and integrated 220 into the network, the method comprises training the updated version of the neural network on the training dataset, at fixed technology, which corresponds to updating 230 the matrix w of the connection weights of the network, for instance by a back-propagation method.

In embodiments, a plurality of candidate topological changes may be selected at the same iteration 220, i.e., for instance a number M of topological changes exhibiting the M greatest reductions of the cost function J. In that case, the update of the connection weights matrix W may be performed once for all the selected topological changes, or in other words after integration of all selected topological changes in the network's topology.

The topological optimization phase 200 comprises a plurality of iterations, until the cost function is no longer minimized by any candidate topological change.

It can be underlined that the building method allows obtaining an optimized neural network without involving a heavy learning phase, because one can readily evaluate the impact of any candidate topological change on the network's performance without actually performing the change and training of the network in order to determine its best performance with said topology.

Distributed Computing

In some embodiments, the neural network comprises distinct parts that are intended to be implemented on two distinct destination computing units.

This can for instance be the case of an implementation of the neural network in an Internet of Things architecture, where part of the neural network relates to a process performed by a destination computing unit 2' located at the sensor, or integrated within the sensor, and another part of the neural network relates to a process performed by a destination computing unit 2" located remote from the sensor, such as in an IoT platform like a gateway or a central server.

Figure 3A:
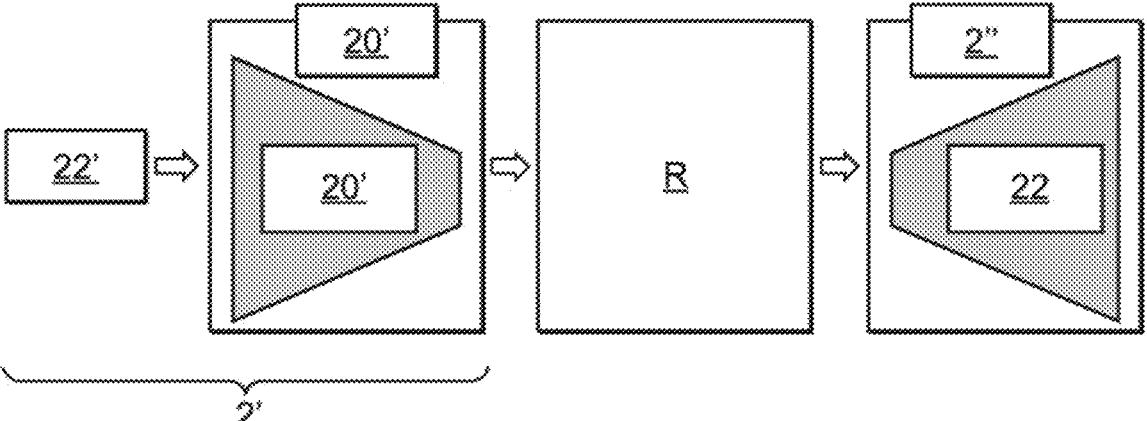
FIG. 3a schematically represents the implementation of a neural network on a distributed architecture, FIG. 3b schematically represents the implementation of a neural network comprising a compressor block and a decompressor block on a distributed architecture.

For instance, and as shown schematically in FIG. 3a, a sensor may implement a preprocessing of data using part P1 of the neural network, transfer the preprocessed data to a remote platform, for instance via a telecommunication network R and said platform exploits the data through another processing, using another part P2 of the neural network.

Figure 3B:
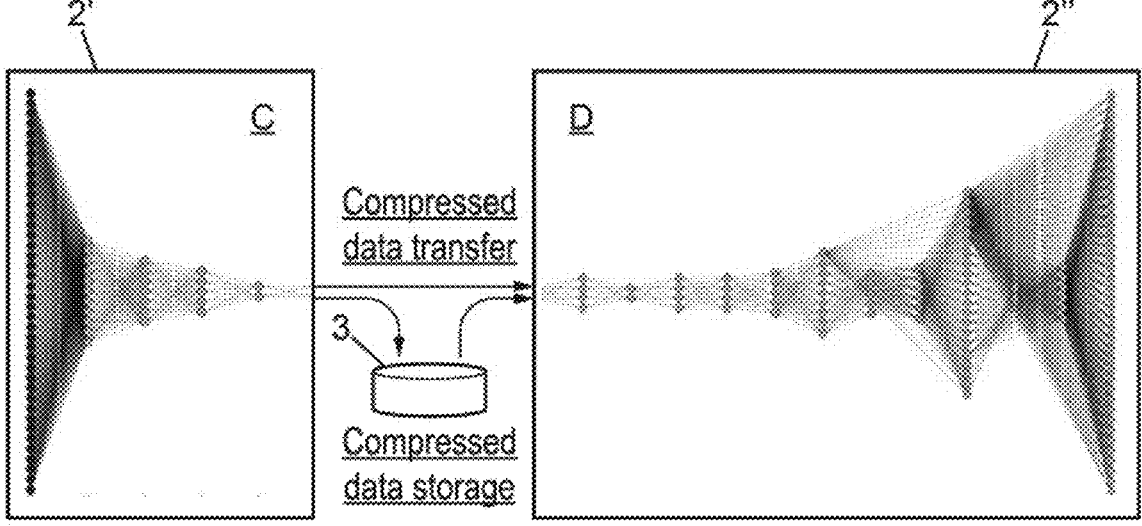

According to another example shown in FIG. 3b, the neural network may be used to compress and decompress data. The neural network may be built in order to comprise a compressor block C, a decompressor block D, such that the output X of the neural network is equal to the input X.

Integration in an IoT architecture may be such that a sensor 2' implements the compressor block of the neural network, transfers the compressed data to a remote IoT platform 2", and said platform optionally implements the decompressor block of the neural network prior to processing further the data. This enables transferring lesser amounts of data and hence consuming less energy on the sensor's side.

Thus in the case of distributed implementation of the neural network, two cost functions must be taken into account, which relate respectively to each destination computing unit. In the previous example, one can define a cost function $J^c$ of the destination computing unit on the sensor side, which can be for instance a cost function corresponding to a compressor block of the neural network:

$$J^c(\Gamma^c, W^c, n) = e(\Gamma^c, W^c) + \lambda_E^c(E^c(\Gamma^c, n) - E_{max}^c)^+ + \lambda_M^c$$
$$(M^c(\Gamma^c, n) - M_{max}^c)^+ + \lambda_M^c(T^c(\Gamma^c, n) - T_{max}^c)^+ \quad (30)$$

One can define another cost function $J^d$ of the destination computing unit on the IoT platform side, which can be for instance a cost function corresponding to a decompressor block of the neural network:

$$J^d(\Gamma^d, W^d, n) = e(\Gamma^d, W^d) + \lambda_E^d(E^d(\Gamma^d, n) - E_{max}^d)^+ + \lambda_M^d$$
$$(M^d(\Gamma^d, n) - M_{max}^d)^+ + \lambda_M^d(T^d(\Gamma^d, n) - T_{max}^d)^+ \quad (31)$$

The training of the whole network may then be performed by minimizing a global cost function which is a convex combination of the two cost functions $J^c$ and $J^d$ introduced above:

$$J(\Gamma, W, n) = \alpha J^c(\Gamma^c, W^c, n) + (1-\alpha)J^d(\Gamma^d, W^d, n) \quad (32)$$

Where $0 < \alpha < 1$ and a may be selected according to the relative importance of each term of the global cost function.

Thus, in embodiments, the method for building such a neural network intended to be implemented by two distinct computing units may comprise an initializing step 100 of a neural network according to an initial topology. Said topology may comprise:

An input layer receiving an input X,

An output layer outputting X, and

A hidden layer.

Said initial topology may be trained, using the global cost function introduced above, on the learning dataset. Then a subtractive step 101 identical to a subtractive phase of the topological optimization phase 200 described above is implemented in order to reduce the size of the network while preserving the accuracy of its response.

Then, the hidden layer is subdivided 102 into three identical layers, and the method then comprises a training of the sub-network formed by those three identical layers, using the same global cost function, and a subtractive step is implemented on the new central layer.

One can then define a compressor block C, which is defined by all the layers extending between the input layer and the central layer (including the input layer and the central layer), and a decompressor block defined by all the layers extending between the central layer and the output layer (including the output layer and the central layer).

Each block then undergoes a respective topological optimization phase, under the constraint: there is no direct connection between the compression and the decompression blocks, except via the central layer.

The method then comprises a phase of updating the connection weights 300 of the complete neural network, in order to minimize the global cost function. The steps 102 to 300 are iterated in order to reduce the size of the central layer which sets the size of the compressed data, until further reduction is not possible unless increasing the decompression error. A maximum decompression error may be predefined and the iterations are performed until said maximum decompression error is reached.

In use, a sensor may therefore compress acquired data and transfer those compressed data to a remote platform. As shown in FIG. 3b, the compressed data may be stored for later use or may be decompressed for a further processing. The storage memory may be a storage server 3 or memory distinct from the destination computing units 2', 2". Application of the building method in this context thus allows reducing the amount of transferred data within networks or IoT architectures and to reduce the amount of stored data as well as the physical resources (electricity, carbon footprint) needed for this storage. On FIG. 3b, the example of neural network which is shown comprises a compressor block which compresses data to only two coefficients (size of the last layer of the compressor block), while the decompressor block outputs the input data with an error of less than 1%.

The building method detailed above can also be implemented for building a neural network forming a digital twin of a system, i.e., copying the actual behavior of said system. It results from this method a character of parsimony, i.e., of less resource requirements, in both the size of the neural network (and hence the resources necessary for its execution), the amount of data and physical resources needed for its training. Parsimony also applies in the learning mechanism of the network itself, since the network is built and learnt with only elementary perturbations that allow taken in account new pieces of data, without degrading the performance of the network. This leads to a neural network which exhibits high accuracy with only little resource.

Figure 4:
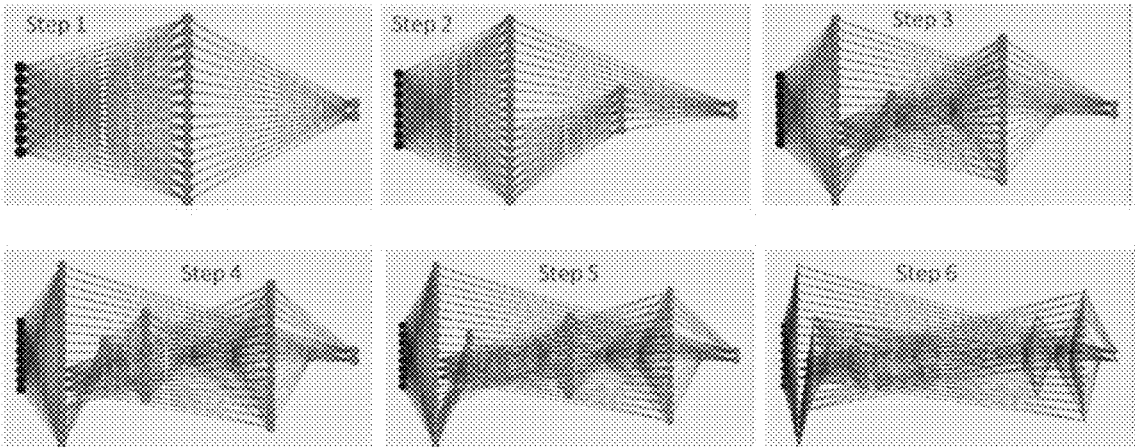
FIG. 4 represents steps of building an example of neural network in accordance with an embodiment of the method, FIG. 5 qualitatively represents the effects of implementing the method according to an embodiment of the disclosure for building a neural network forming a digital twin of a system.

An example presented in FIG. 4 shows an exemplary execution of the method, showing the results of six iteration of the topological optimization phase 200. Each phase comprises selection and simultaneous integration of a plurality of elementary topological changes. One can immediately notice the very simple and light (so-called parsimonious) structure of the thus obtained neural network.

Figure 5:
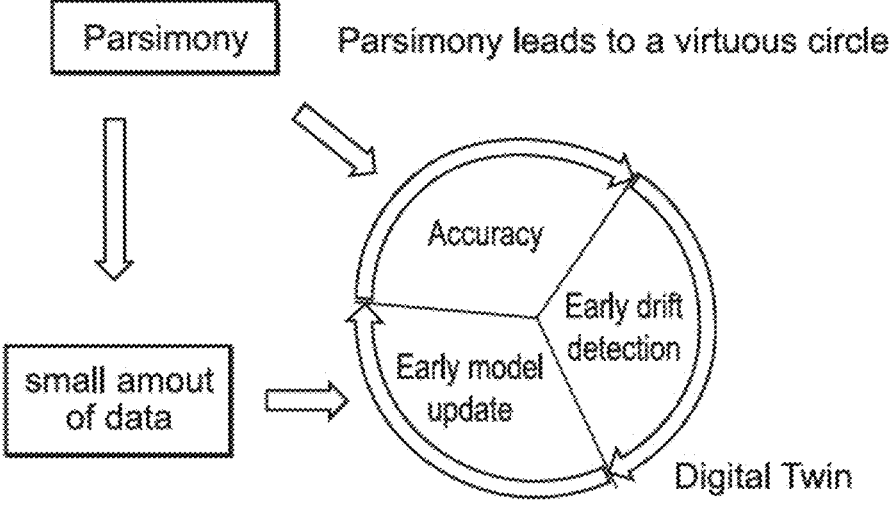

With reference to FIG. 5, in the context of digital twin, high accuracy leads to early drift detection by detecting a discrepancy between the output of the neural network and the actual system. This drift may be caused for instance by ageing, or a context change of the actual system. Early drift detection allows early update of the model in order to remain accurate to the actual system. What's more, parsimony involved in the building of the network also enables to quickly and with little amount of data, to update the neural network in order to adapt to the detected drift.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for building a neural network configured to be run on a destination processing unit, the method being implemented by a system comprising a computer and a memory storing a learning dataset, the method comprising:

providing a neural network having an initial topology comprising an input layer, a hidden layer, and a set of output nodes, and training said initial topology over the learning dataset, and optimizing the topology of the neural network, wherein optimizing the topology of the neural network comprises at least one iteration of the following steps:

for each of a plurality of candidate topological changes, estimating a variation induced by the candidate topological change on:

the neural network's error, and a value of at least one physical quantity needed for executing the neural network on the destination processing unit, selecting at least one of the candidate topological changes based on said estimation and updating the topology of the neural network according to said selected topological change, and training the updated neural network over the learning dataset, wherein the neural network comprises at least a compressor block adapted to generate compressed data out of input data and a decompressor block adapted to decompress the data compressed by the compressor block, and wherein the method comprises at least one topology optimization step implemented on the compressor block and decompressor block, followed by at least one training step of the whole neural network with fixed topology.

2. The method according to claim 1, wherein the at least one physical quantity needed for executing the neural network on the destination processing unit includes at least one of:

an energy consumption of the destination processing unit for each inference of the neural network, a memory capacity requirement of the destination processing unit for each inference of the neural network, and a time required by the destination processing unit for each inference of the neural network.

3. The method according to claim 1, wherein the estimation step for a given candidate topological change comprises estimating the variation induced by the candidate topological change on a cost function formed as a weighted sum of:

a term representative of a best error of the neural network obtainable by the neural network incorporating the candidate topological change on the training dataset, and at least one penalty term corresponding to each respective physical quantity exceeding a corresponding maximum value.

4. The method according to claim 3, wherein the penalty term corresponding to a physical quantity is a positive part of a difference between a value of the physical quantity needed for executing the neural network incorporating the candidate topological change and a corresponding maximum value.

5. The method according to claim 3, wherein each candidate topological change is either additive or subtractive, wherein an additive topological change includes addition of at least one node or link between two nodes, or, if the neural network is a convolutional neural network, addition of at least one tensor or convolutional kernel, and wherein a subtractive topological change includes removal of at least one node or link between two nodes, or, if the neural network is a convolutional neural network, removal of at least one tensor or convolutional kernel, the method comprising selecting at least one additive candidate topological change maximizing a diminution of the cost function over all candidate topological changes and, if no additive candidate topological change provides a diminution of the cost function, selecting at least one subtractive candidate topological change minimizing the increase of the cost function.

6. The method according to claim 1, wherein each candidate topological change is either additive or subtractive, wherein an additive topological change includes addition of at least one node or link between two nodes, or, if the neural network is a convolutional neural network, addition of at least one tensor or convolutional kernel, and wherein a subtractive topological change includes removal of at least one node or link between two nodes, or, if the neural network is a convolutional neural network, removal of at least one tensor or convolutional kernel.

7. The method according to claim 1, wherein estimating the variation induced by a candidate topological change on the neural network's error comprises estimating a best error obtainable by the neural network incorporating the candidate topological change on the training dataset, by computing the Lagrangian of the neural network including the candidate topological change.

8. The method according to claim 1, wherein the compressor block and decompressor block of the neural network are configured to be run on distinct destination processing units, and the training step of the whole neural network comprises minimizing a cost function J being a convex combination of a cost function $J^c$ of the compressor block on its respective destination processing unit and a cost function $J^d$ of the decompressor block on its respective destination processing unit:

$$J=\alpha J^c+(1-\alpha)J^d$$

where alpha is a weighting parameter and each cost function of the compressor block and decompressor block is a weighted sum of:

a term representative of a best error of the respective block of the neural network obtainable by the neural network at the fixed topology of the training step, and at least one penalty term representative of a respective physical quantity, needed for executing the respective block on the respective destination processing unit, exceeding a determined threshold, each threshold depending on the destination processing unit of the respective block of the neural network.

9. A computer configured for building a neural network, the computer comprising:

a memory storing computer-executable code instructions; and a processor in communication with the memory, wherein in response to executing the code instructions, the processor is configured to perform the method of claim 1.

10. A sensor, comprising:

a sensing element adapted to acquire data, a communication interface with a remote computing device, and a processor, wherein the sensor is configured to implement a compressor block of a neural network obtained by implementing the method of claim 1 in order to compress data acquired by the sensing element, and to transfer the compressed data to the remote computing device.

11. A computing device, comprising:

a processor, and a communication interface with at least one remote sensor, wherein the computing device is configured to receive compressed data transferred by a remote sensor, and to implement a decompressor block of a neural network obtained by implementing the method according to claim 1 in order to decompress said data.

12. An Internet of Things (IOT) architecture, comprising:

a plurality of sensors, wherein each sensor comprises a sensing element adapted to acquire data, a remote communication interface and a sensor processor, and an IoT platform comprising a remote communication interface and a processor, wherein each sensor is configured to implement a compressor block of a neural network obtained by implementing the method of claim 1 in order to compress acquired data, and transfer said data to the IoT platform, and the IoT platform is configured to implement the decompressor block of said neural network in order to decompress the data compressed and transferred by the sensor.

13. The Internet of Things architecture according to claim 12, further comprising a memory configured to receive, from each sensor, compressed acquired data, to store said compressed acquired data and to transfer said compressed acquired data to the remote computing device.

14. A method for building a neural network configured to be run on a destination processing unit, the method being implemented by a system comprising a computer and a memory storing a learning dataset, the method comprising:

providing a neural network having an initial topology comprising an input layer, a hidden layer, and a set of output nodes, and training said initial topology over the learning dataset, and optimizing the topology of the neural network, wherein optimizing the topology of the neural network comprises at least one iteration of the following steps:

for each of a plurality of candidate topological changes, estimating a variation induced by the candidate topological change on:

the neural network's error, and a value of at least one physical quantity needed for executing the neural network on the destination processing unit, selecting at least one of the candidate topological changes based on said estimation and updating the topology of the neural network according to said selected topological change, and training the updated neural network over the learning dataset, wherein the estimation step for a given candidate topological change comprises estimating the variation induced by the candidate topological change on a cost function formed as a weighted sum of:

a term representative of a best error of the neural network obtainable by the neural network incorporating the candidate topological change on the training dataset, and at least one penalty term corresponding to each respective physical quantity exceeding a corresponding maximum value, wherein the penalty term corresponding to a physical quantity is a positive part of a difference between a value of the physical quantity needed for executing the neural network incorporating the candidate topological change and a corresponding maximum value.

15. The method according to claim 14, wherein the at least one physical quantity needed for executing the neural network on the destination processing unit includes at least one of:

an energy consumption of the destination processing unit for each inference of the neural network, a memory capacity requirement of the destination processing unit for each inference of the neural network, and a time required by the destination processing unit for each inference of the neural network.

16. A method for building a neural network configured to be run on a destination processing unit, the method being implemented by a system comprising a computer and a memory storing a learning dataset, the method comprising:

providing a neural network having an initial topology comprising an input layer, a hidden layer, and a set of output nodes, and training said initial topology over the learning dataset, and optimizing the topology of the neural network, wherein optimizing the topology of the neural network comprises at least one iteration of the following steps:

for each of a plurality of candidate topological changes, estimating a variation induced by the candidate topological change on:

the neural network's error, and a value of at least one physical quantity needed for executing the neural network on the destination processing unit, selecting at least one of the candidate topological changes based on said estimation and updating the topology of the neural network according to said selected topological change, and training the updated neural network over the learning dataset, wherein estimating the variation induced by the candidate topological change on the neural network's error comprises estimating a best error obtainable by the neural network incorporating the candidate topological change on the training dataset, by computing the Lagrangian of the neural network including the candidate topological change.

17. The method according to claim 16, wherein the estimation step for a given candidate topological change comprises estimating the variation induced by the candidate topological change on a cost function formed as a weighted sum of:

a term representative of a best error of the neural network obtainable by the neural network incorporating the candidate topological change on the training dataset, and at least one penalty term corresponding to each respective physical quantity exceeding a corresponding maximum value.

* * * * *